United States Patent

Bever

[11] Patent Number: 5,398,898
[45] Date of Patent: Mar. 21, 1995

[54] HOLDING DEVICE

[76] Inventor: Damon S. Bever, 245 N. Shafter Ave., Shafter, Calif. 93263

[21] Appl. No.: 143,662

[22] Filed: Nov. 1, 1993

[51] Int. Cl.$^6$ .............................................. A47G 23/02
[52] U.S. Cl. ................................... 248/154; 248/311.2; 248/313; 279/113
[58] Field of Search ............ 248/178, 184, 154, 346.1, 248/346, 310, 680, 681, 311.2, 313, 316.2, 172, 146; 224/42.45 R; 220/737, 738; 279/112, 113

[56] References Cited

U.S. PATENT DOCUMENTS

| 13,787 | 11/1855 | Horton | 279/113 |
| 57,383 | 8/1866 | Ross | 279/113 |
| 470,370 | 3/1892 | Westcott | 279/113 X |
| 539,971 | 5/1895 | Anderson | 279/113 X |
| 630,734 | 8/1899 | Oothout | 248/154 |
| 943,063 | 12/1909 | Cooke | 248/178 |
| 1,201,061 | 10/1916 | Lang | 248/154 |
| 1,828,249 | 10/1931 | Hammond | 248/154 |
| 2,515,216 | 7/1950 | Guelph | 279/113 X |
| 3,101,567 | 8/1963 | Stiller | 248/346.1 |
| 4,178,002 | 10/1978 | Barlett | 248/310 X |
| 4,549,727 | 10/1985 | Kozar | 248/310 X |
| 5,149,032 | 9/1992 | Jones et al. | 248/154 |
| 5,154,380 | 10/1992 | Risca | 248/154 |

Primary Examiner—Ramon O. Ramirez
Assistant Examiner—Korie H. Chan
Attorney, Agent, or Firm—Hugh E. Smith

[57] ABSTRACT

An adjustable holder comprising in combination a hollow housing having three slots formed on a top surface thereof and four depending side edges. Three cup grippers extend from a respective one of the three slots for gripping a cup on the top surface of the hollow housing. Each cup grippers are movable by way of a respective one of the three gearing assemblies located within the housing. One of the three gearing assemblies is controlled by the operator of the cup holder via a control knob extending from one of the side edges of the housing. Such gearing assembly that is controlled by the operator is referred to as the master gearing assembly.

1 Claim, 4 Drawing Sheets

HOLDING DEVICE

BACKGROUND OF THE INVENTION

1. Field of the Invention

The present invention relates to a holding device and more particularly pertains to such a device which is used for holding cups.

2. Description of the Prior Art

The use of cup or beverage holding devices are known in the prior art. More specifically, such holders heretofore devised and utilized for the purpose of holding cups are known to consist basically of familiar, expected and obvious structural configurations, notwithstanding the myriad of designs encompassed by the crowded prior art which have been developed for the fulfillment of countless objectives and requirements.

For example U.S. Pat. No. 4,645,157 discloses a beverage holder for a vehicle. The beverage holder is adapted to be mounted on a vehicle body above an armrest.

U.S. Pat. No. 4,836,488 discloses a coaster with an adjustable means for retaining a beverage container. The coaster includes a hook adapted to be connected to a container and an associated elastic shock cord.

U.S. Pat. No. 5,054,733 discloses a container support device. The support device is particularly adapted for use in a vehicle. The device is adapted to receive differently sized and configured beverage cups, cans and bottles and prevent spillage.

Furthermore, U.S. Pat. No. 5,149,032 discloses a universal cup holder for use in vehicles. The cup holder includes a base and a pair of upright arms which are shiftable toward and away from a set of fixed arms.

In this respect, the cup holding device according to the present invention substantially departs from the conventional concepts and designs of the prior art, and in doing so provides an apparatus primarily developed for the purpose of removably securing a container.

Therefore, it can be appreciated that there exists a continuing need for a new and improved cup holding device which utilizes a set of movable gripping elements. In this regard, the present invention substantially fulfills this need.

SUMMARY OF THE INVENTION

In view of the foregoing disadvantages inherent in the known types of cup holding devices now present in the prior art, the present invention provides an improved cup holding device. As such, the general purpose of the present invention, which will be described subsequently in greater detail, is to provide a new and improved cup holding device apparatus and method which has all the advantages of the prior art and none of the disadvantages.

To attain this, the present invention essentially comprises an adjustable cup holder comprising, in combination a hollow rectangular housing having a top surface and four depending side edges, a central core integral with the top surface and extending within the hollow housing, an aperture extending through the central core, three slots formed through the top surface of the housing each slot extending radially outward from the center of the top surface, the slots being positioned 120 degrees relative to one another, an aperture formed within one of the depending sides a disk gear having a top surface and a bottom surface, the disk gear being rotatably coupled to the bottom of the central core, the disk gear having a planar inner area and a outer periphery, the outer periphery having a geared top surface a master gearing assembly having a knob rotatably positioned within the aperture of the depending side, a worm gear positioned beneath one of the slots of the top surface, the worm gear having a first end and a second end, the first end being rotatably coupled to the central core, the second end being connected to the knob, a bevel gear connected to the second end of the worm gear intermediate the knob and the first end of the worm gear, the bevel gear intermeshed with geared surface of the disk gear, rotation of the knob effecting rotation of the worm gear and rotation of the bevel gear, rotation of the bevel gear effecting rotation of the disk gear three slave gearing assemblies, each slave gearing assembly including a worm gear positioned beneath one of the slots of the base, the worm gear having a first end and a second end, the first end being rotatably connected to the central core, the second end being rotatably connected to the top surface of the base, a bevel gear connected to the second end of the worm gear, the bevel gear intermeshed with the geared surface of the disk gear, rotation of the disk gear effecting rotation of the bevel gear and rotation of the worm gear; and three cup grippers, each cup gripper having a first end and a second end, the first end having a cup engaging surface, the second end having a geared aperture, the geared aperture adapted to ride along one of the worm gears of the gearing assemblies.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is a further object of the present invention to provide a new and improved cup holding device which is of a durable and reliable construction.

An even further object of the present invention is to provide a new and improved cup holding device which is susceptible of a low cost of manufacture with regard to both materials and labor, and which accordingly is then susceptible of low prices of sale to the consuming public, thereby making such cup holding devices economically available to the buying public.

Still yet another object of the present invention is to provide a new and improved cup holding device which provides in the apparatuses and methods of the prior art some of the advantages thereof, while simultaneously overcoming some of the disadvantages normally associated therewith.

Still another object of the present invention is to provide a new and improved cup holding device which employs three simultaneously moveable gripping elements.

Yet another object of the present invention is to provide a new and improved cup holding device which includes removable gripping elements.

Even still another object of the present invention is to provide a new and improved cup holding device which is adapted to hold various other objects.

Lastly, it is an object of the invention to provide an adjustable holder comprising a hollow housing having a top surface and depending side edges, a central core integral with the top surface and extending within the hollow housing, an aperture extending through the central core, a plurality of slots formed through the top surface of the housing each slot extending radially outward from the center of the top surface, an aperture formed within one of the depending sides a disk gear having a top surface and a bottom surface, the disk gear being rotatably coupled to the bottom of the central core, the disk gear having a planar inner area and a outer periphery, the outer periphery having a geared top surface a master gearing assembly having a knob rotatably positioned within the aperture of the depending side, a worm gear positioned beneath one of the slots of the top surface, the worm gear having a first end and a second end, the first end being rotatably coupled to the central core, the second end being connected to the knob a bevel gear connected to the second end of the worm gear intermediate the knob and the first end of the worm gear, the bevel gear intermeshed with geared surface of the disk gear, rotation of the knob effecting rotation of the worm gear and rotation of the bevel gear, rotation of the bevel gear effecting rotation of the disk gear a plurality of slave gearing assemblies, each slave gearing assembly including a worm gear positioned beneath one of the slots of the base, the worm gear having a first end and a second end, the first end being rotatably connected to the central core, the second end being rotatably connected to the top surface of the base, a bevel gear connected to the second end of the worm gear, the bevel gear intermeshed with the geared surface of the disk gear, rotation of the disk gear effecting rotation of the bevel gear and rotation of the worm gear a plurality of grippers each having an engaging portion and a geared aperture, the geared aperture adapted to ride along one of the worm gears of the gearing assemblies.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
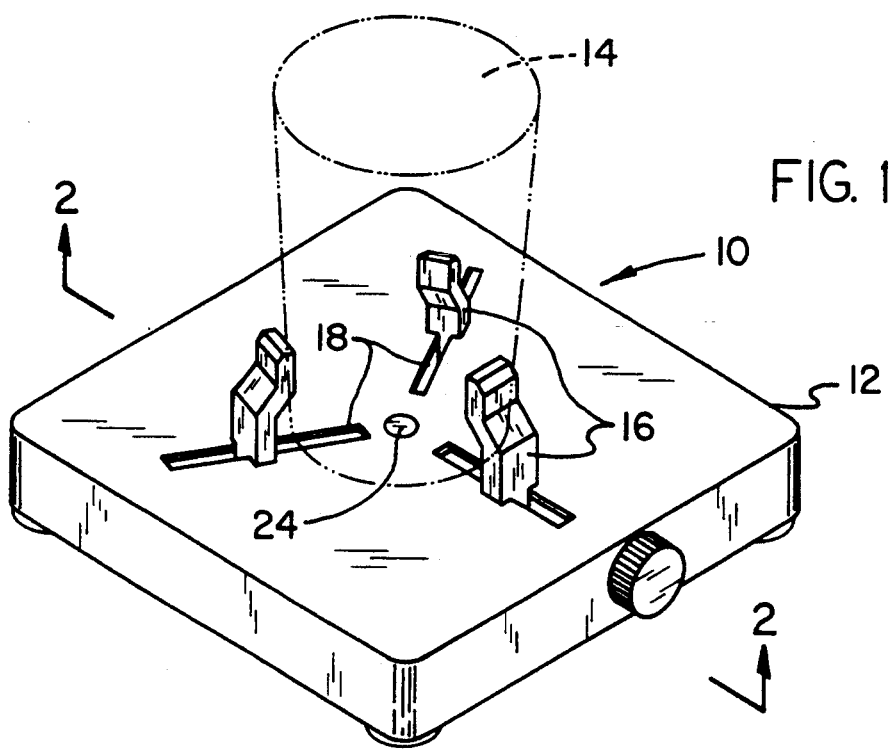
FIG. 1 is a perspective view of the first embodiment of the present invention.
Figure 2:
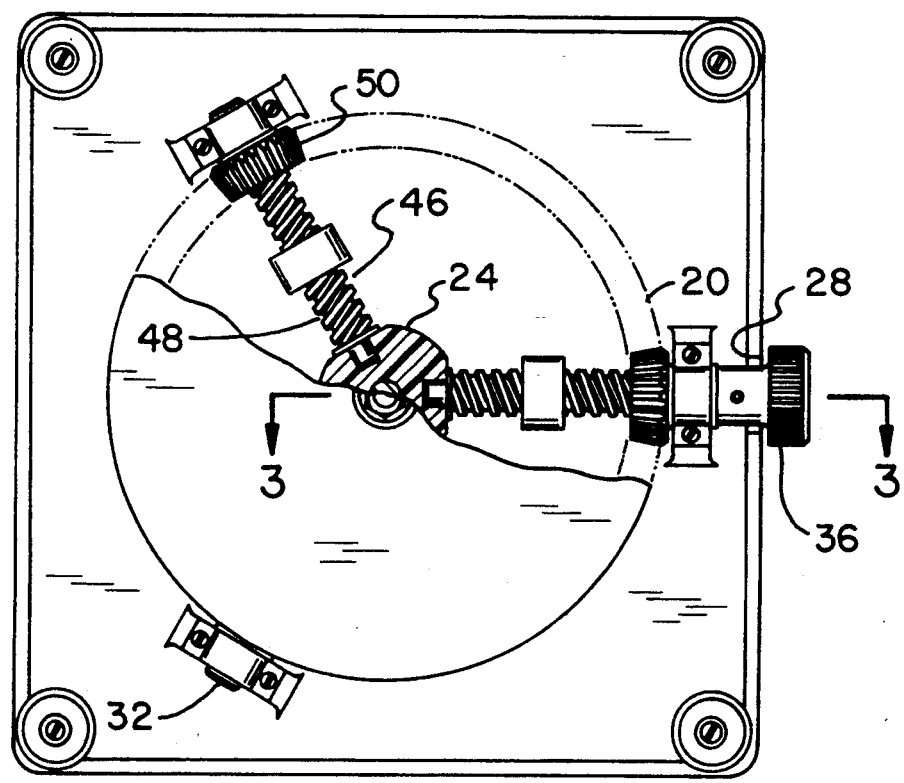
FIG. 2 is a sectional view taken along line 2—2 of FIG. 1.
Figure 3:
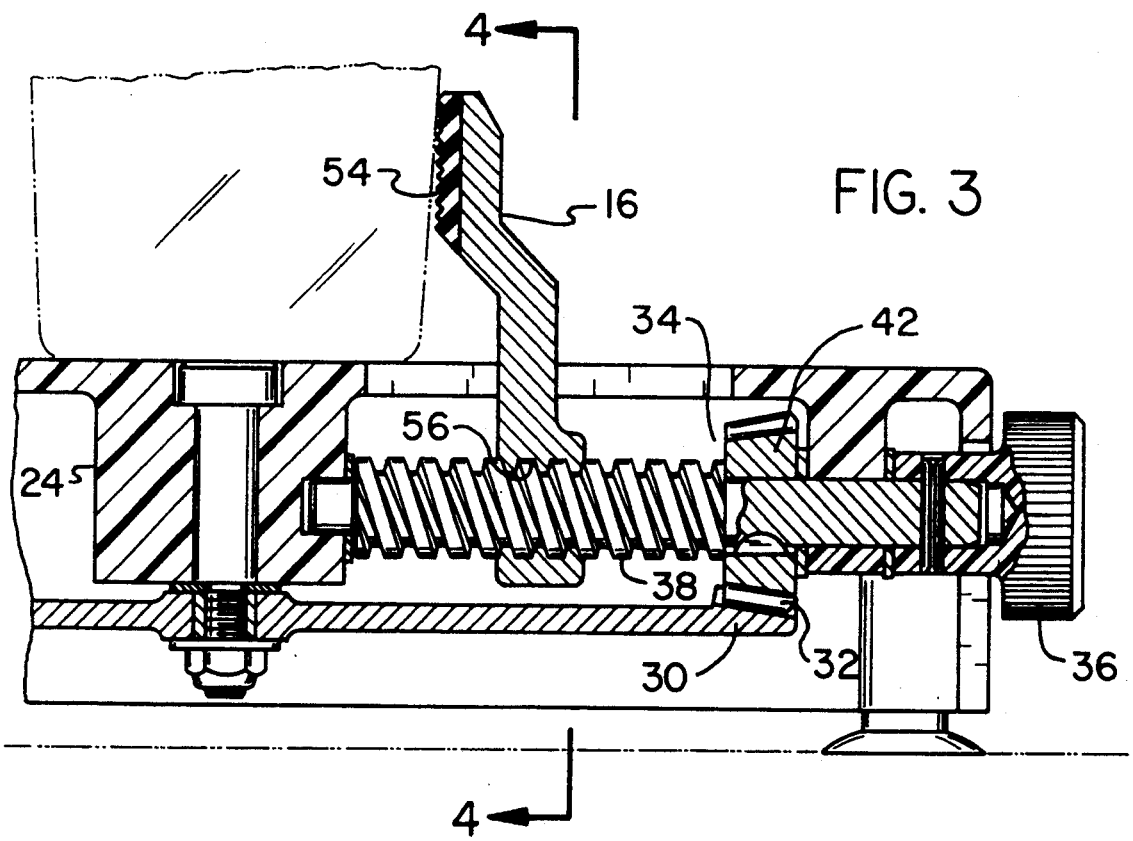
FIG. 3 is a sectional view taken along line 3—3 of FIG. 2.
Figure 4:
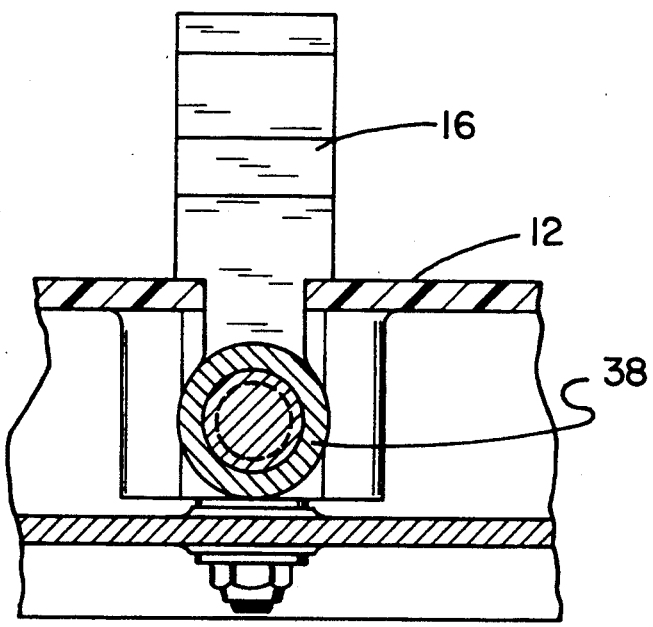
FIG. 4 is a sectional view taken along line 4—4 of FIG. 3.
Figure 5:
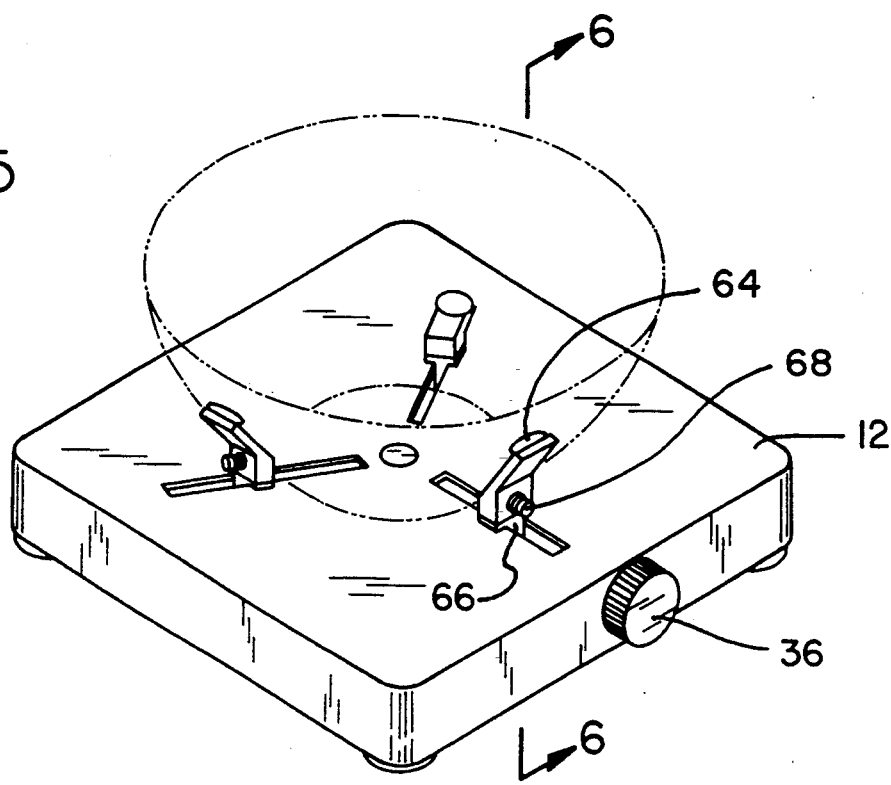
FIG. 5 is a view of the second embodiment of the present invention.
Figure 6:
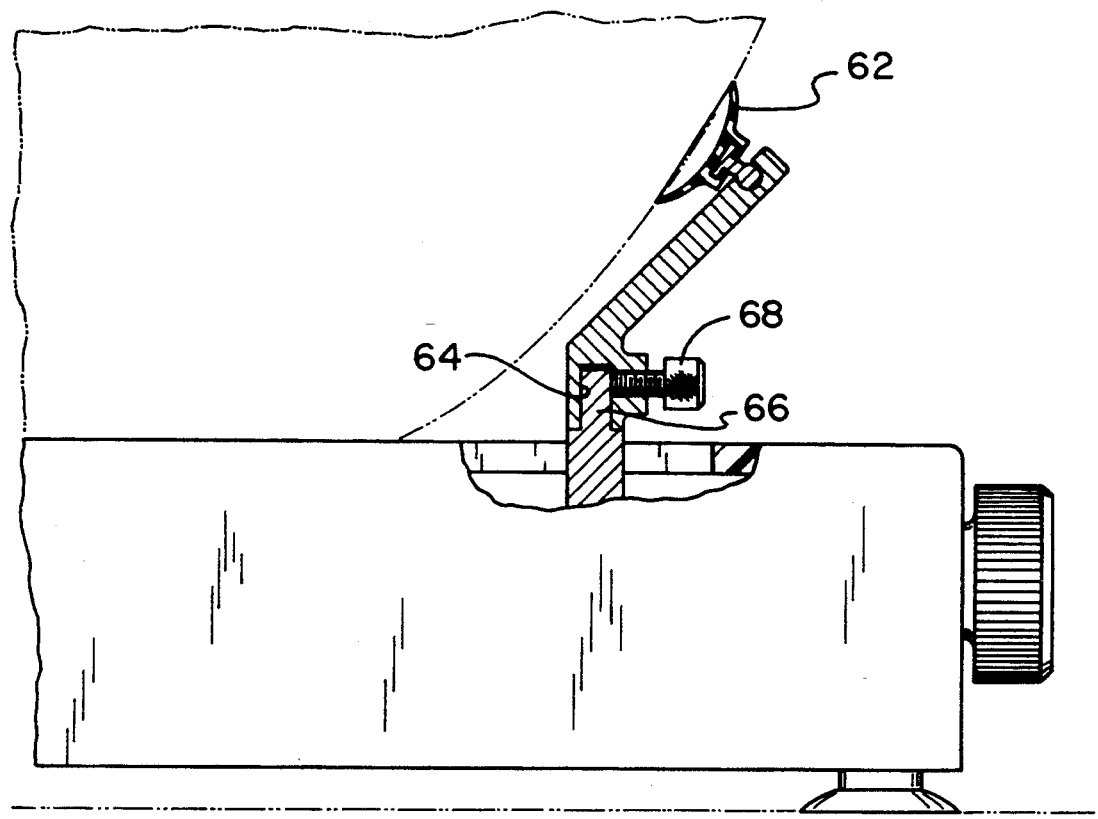
FIG. 6 is a sectional view taken along line 6—6 of FIG. 5.
Figure 7:
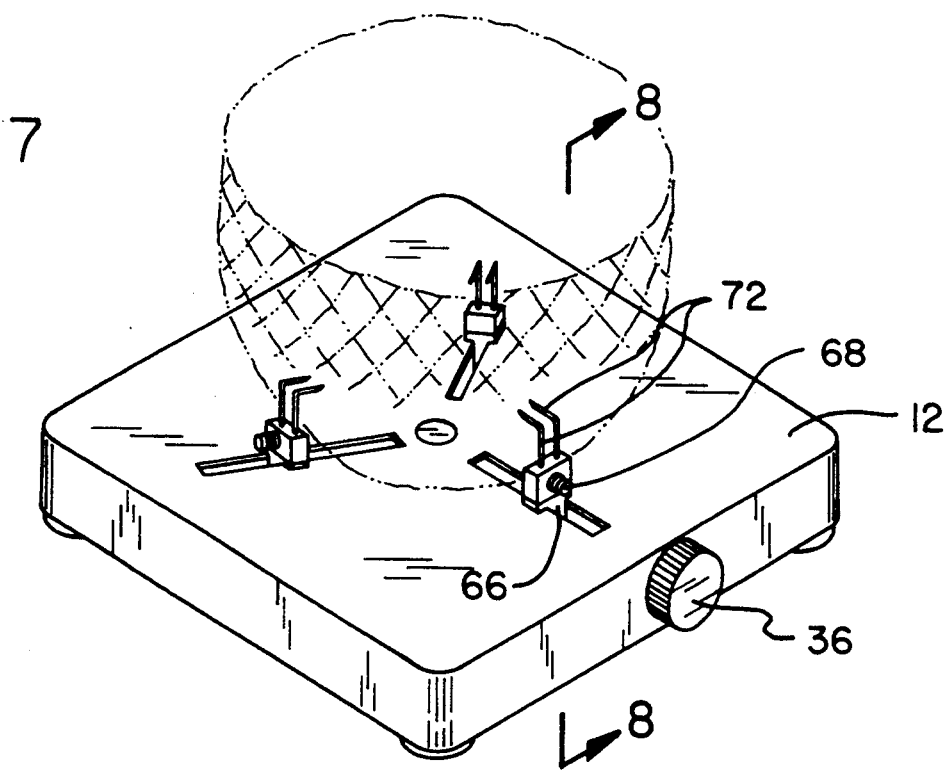
FIG. 7 is a view of the third embodiment of the present invention.
Figure 8:
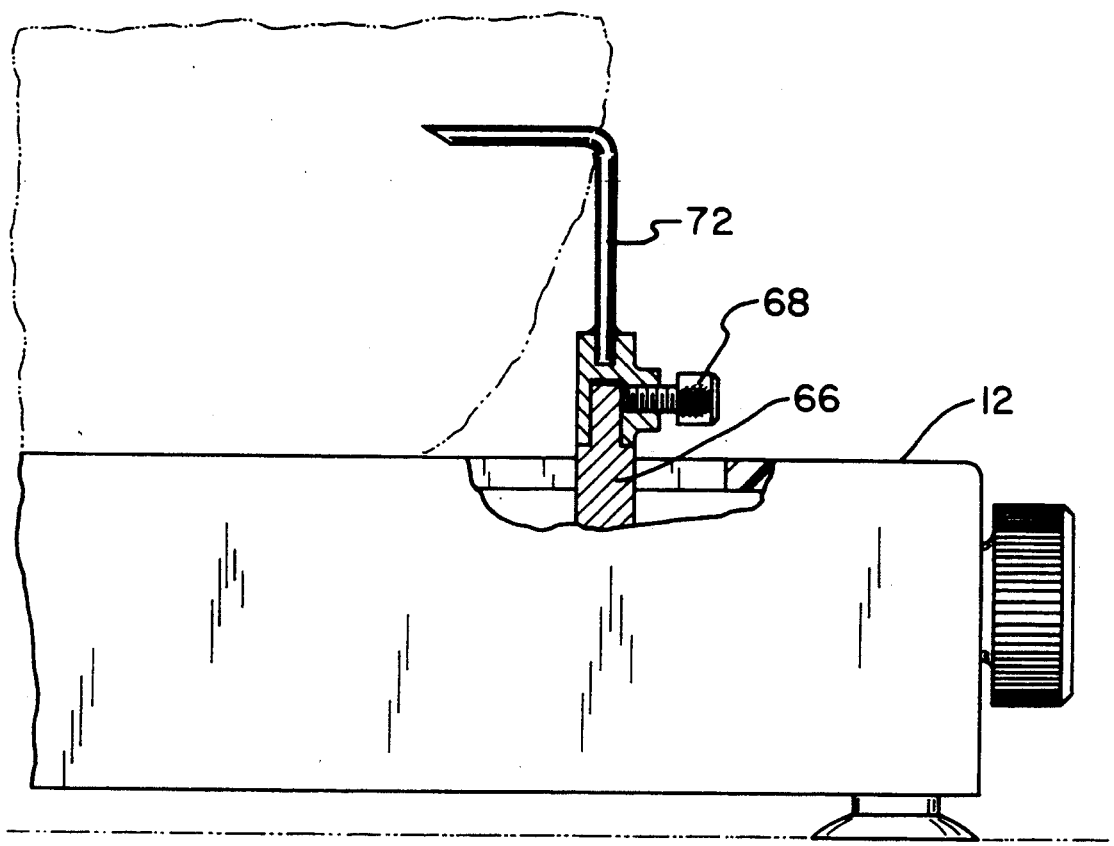
FIG. 8 is a sectional view taken along line 8—8 of FIG. 7.

With reference now to the drawings, and in particular to FIG. 1 thereof, a new and improved cup holding device embodying the principles and concepts of the present invention and generally designated by the reference numeral 10 will be described.

The present invention relates to an adjustable cup holder 10. In its broadest context the invention includes a housing 12 upon which one can rest a container 14 of fluid. The holder of the present invention further includes three cup grippers 16 adapted to engage the cup upon its exterior surface. The cup grippers ride within slots 18 formed within the top surface of the housing. Three gearing assemblies 20 are employed to simultaneously move the cup grippers. The cup grippers are moved in accordance with the size of the drinking container.

The housing 12 is hollow and rectangular and includes a top surface, four depending side edges, and a central core integral with the top surface. The central core extends within the hollow housing and encompasses a centrally disposed aperture 24. Any metal or light weight plastic material can be utilized in the construction of the housing and the central core.

Furthermore, three slots 18 are formed through the top surface of the housing with each slot extending radially outward from the center of the top surface. Each of the slots is positioned 120 degrees relative to one another. Additionally, an aperture 28 is formed within one of the depending sides. The depending side into which the aperture is formed is referred to as the master side.

As indicated above, the cup grippers 16 are moved by way of three gearing assemblies. All of the gearing assemblies are interrelated by way of a disk gear 30. The disk gear has a top surface and a bottom surface and is rotatably coupled to the bottom of the central core. Furthermore, the disk gear has a planar inner area and a outer periphery with the outer periphery having a geared top surface 32.

One of the three gearing assemblies 34 is controlled by the operator of the holder. The gearing assembly controlled by the operator is referred to as the master gearing assembly and control of it is enabled by way of a control knob 36. The knob of the master gearing assembly is rotatably positioned within the aperture 28 of the depending side. The master gearing assembly further includes a worm gear 38 positioned beneath one of the slots of the top surface. The worm gear has a first end and a second end with the first end rotatably coupled to the central core 24 and the second end connected to the knob 36. Further included in the master gear assembly is a bevel gear 42. The bevel gear is connected to the second end of the worm gear 38 intermediate the knob and the first end, of the worm gear. The bevel gear 42 is intermeshed with the geared surface 32 of the disk gear 30. Rotation of the knob 36 effects rotation of the worm gear 38 and rotation of the bevel gear 42. In turn, rotation of the bevel gear 42 effects rotation of the disk gear 30.

The two gearing assemblies opposite the master gearing assembly 34 are referred to a slave gearing assemblies. Each of the slave gearing assemblies includes a worm gear 48 positioned beneath one of the slots of the base. Each worm gear has a first end and a second end, with the first end rotatably connected to the central core 24. The second end is rotatably connected to the surface of the base. Similar to the master gearing assembly 34, a bevel gear is connected to the second end of the worm gear 48. The bevel gear 50 is intermeshed with the disk gear 30. Rotation of the disk gear 30 effects concurrent rotation of all bevel gears and rotation of all worm gears.

The cup holding device further includes three cup grippers 16. Each cup gripper has a first end and a second end. The first end has a cup engaging surface 54 and the second end has a threaded aperture 56. The threaded aperture 56 is adapted to ride along one of the worm gears which functions as a lead screw. As a result, the rotation of a knob :16 in one direction or the other rotates all the gearing to move the grippers equally in a radial direction.

In the second embodiment of the invention, the three grippers 62 are formed from an upper portion including the engaging portion and a separable lower portion including the threaded aperture. The relationship between the upper and lower portion is such that the upper portion is removably secured to the lower portion. The securement can be achieved by a groove 64 formed within the upper portion and a tab 66 formed within the lower portion with the tab adapted to be inserted within the groove of the upper portion.

A set screw 68 is employed to achieve final securement between the upper and lower portions. Furthermore, in the second embodiment the engaging portion of each of the grippers is a suction cup element.

The third embodiment of the device is substantially the same as that of the second. However, in the third embodiment each of the suction cups is replaced by two meat spikes 72. Thus, the devices of the second and third embodiments are adapted to hold objects other that just cups. The suction cup enable an increased gripping power over a variety of objects. Additionally, the meat spikes enable the device to be used to stabilize meats while they are being carved. The separable coupling between the upper and lower portions of the grippers enable one to use a variety of gripping elements with the same device.

The present invention is a device which is designed to hold a cup, glass, or beverage can securely in place. It consists of three rubber supports, a knob, and gears integrated into a tray-like platform. The supports rest on top of the tray and are located 120 degrees apart. The knob is located on the side of the tray and is connected to the gears which are unseen beneath the tray.

Operating the present invention is a relatively simple procedure. Place a cup down on the tray and in between the three supports. Turning the knob causes the gears to rotate and the supports to close and grasp the cup. Because the supports are adjustable, they fit nearly every size cup or glass. To remove the cup, turn the knob in the opposite direction.

What is claimed as being new and desired to be protected by Letters Patent of the United States is as follows:

1. In combination, a cup and an adjustable cup holder comprising, in combination:
   a cup having a vertical axis and a cylindrical side wall;
   a hollow rectangular housing having a top surface with a center for the receipt of the cup to be held and four depending side edges three of which are imperforate, a central cord integral with the top surface and extending within the hollow housing, an aperture extending through the central core, three slots formed through the top surface of the housing each slot extending radially outward from the center of top surface, the slots being positioned 120° relative to one another, an aperture formed within one of the depending sides;
   a disk gear having a top surface and a bottom surface, the disk gear being rotatably coupled to the bottom of the central core, the disk gear having a planar inner area and an outer periphery, the outer periphery having a geared top surface;
   a master gearing assembly having a knob rotatably positioned within the aperture of the depending side, a worn gear positioned beneath one of the slots of the top surface, the worm gear having a first end and a second end, the first end being rotatably coupled to the central core, the second end being connected to the knob;
   a bevel gear connected to the second end of the worn gear intermediate the knob and the first end of the worm gear, the bevel gear intermeshed with gears of the disk gear, rotation of the knob effecting rotation of the worm gear and rotation of the bevel gear, rotation of the bevel gear effecting rotation of the disk gear;
   two slave gearing assemblies, each slave gearing assembly including a worm gear positioned beneath one of the slots of the base, the worm gear of the slave gearing assemblies having a first end and a second end, the first end being rotatably connected to the central core, the second end being rotatably connected to the top surface of the base, a bevel gear connected to the second end of the worm gear, the bevel gear of the slave gearing assemblies intermeshed with the geared surface of the disk gear, rotation of the disk gear selecting rotation of the bevel gear and rotation of the worm gear; and three cup grippers, each cup grinder being of a one-piece construction and having a first upper end and a second lower end, the first end having an elastomeric cup engaging surface, the second end having a geared aperture, the geared aperture adapted to ride along one of the worn gears of the gearing assemblies, the first end of each gripper being closer to the center of the top surface than the second end of each gripper whereby a cup may be placed directly upon the center of the top surface and then held by the cup engaging surfaces of the first ends of the grippers.

* * * * *